US012260879B2

(12) United States Patent
Kimura et al.

(10) Patent No.: US 12,260,879 B2
(45) Date of Patent: Mar. 25, 2025

(54) MAGNETIC RECORDING AND REPRODUCING DEVICE AND CONTROL METHOD THEREOF

(71) Applicants: Kabushiki Kaisha Toshiba, Tokyo (JP); Toshiba Electronic Devices & Storage Corporation, Tokyo (JP)

(72) Inventors: Kaori Kimura, Yokohama Kanagawa (JP); Takuya Matsumoto, Kawasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 18/460,498

(22) Filed: Sep. 1, 2023

(65) Prior Publication Data
US 2024/0321312 A1     Sep. 26, 2024

(30) Foreign Application Priority Data
Mar. 23, 2023  (JP) ................................ 2023-046838

(51) Int. Cl.
*G11B 20/10* (2006.01)
*G11B 5/02* (2006.01)
*G11B 5/00* (2006.01)

(52) U.S. Cl.
CPC .......... *G11B 20/10481* (2013.01); *G11B 5/02* (2013.01); *G11B 2005/0013* (2013.01); *G11B 2005/0021* (2013.01)

(58) Field of Classification Search
CPC ................ G11B 20/10481; G11B 5/02; G11B 2005/0013; G11B 2005/0021; G11B 5/40
See application file for complete search history.

(56) References Cited

U.S. PATENT DOCUMENTS

| 9,152,568 | B1 | 10/2015 | Seigler et al. |
| 9,953,665 | B1* | 4/2018 | Sakane ................. G11B 5/8408 |
| 10,249,339 | B1 | 4/2019 | Mendonsa et al. |
| 10,468,071 | B1 | 11/2019 | Tasaka et al. |
| 10,734,035 | B1 | 8/2020 | Sun et al. |
| 10,825,478 | B1 | 11/2020 | Matsumoto |
| 11,114,127 | B2 | 9/2021 | Suzuki et al. |
| 11,120,822 | B2 | 9/2021 | Ohtake et al. |
| 11,282,539 | B2 | 3/2022 | Kudo |
| 11,341,994 | B1* | 5/2022 | Goker ...................... G11B 5/40 |
| 2010/0027154 | A1 | 2/2010 | Sonoda |
| 2013/0258517 | A1* | 10/2013 | Poorman ................. G11B 5/40 |
| 2020/0395049 | A1 | 12/2020 | Coffey et al. |
| 2021/0201941 | A1 | 7/2021 | Hyodo |
| 2022/0051693 | A1 | 2/2022 | Hyodo |

(Continued)

FOREIGN PATENT DOCUMENTS

JP     2024-134253 A    10/2024

*Primary Examiner* — Andrew Sasinowski
(74) *Attorney, Agent, or Firm* — Kim & Stewart LLP

(57) ABSTRACT

A magnetic recording and reproducing device includes a magnetic recording medium having a lubricant on a surface of the magnetic recording medium, a heat-assisted magnetic recording head configured to perform magnetic recording on the magnetic recording medium, a humidity sensor, and a write procedure control circuit configured to control a write procedure of the heat-assisted magnetic recording head in accordance with a measurement result of the humidity sensor.

20 Claims, 5 Drawing Sheets

(56) References Cited

U.S. PATENT DOCUMENTS

2023/0063493 A1 3/2023 Matsumoto et al.
2024/0096349 A1 3/2024 Isokawa
2024/0321293 A1 9/2024 Matsumoto

* cited by examiner

MAGNETIC RECORDING AND REPRODUCING DEVICE AND CONTROL METHOD THEREOF

CROSS-REFERENCE TO RELATED APPLICATION(S)

This application is based upon and claims the benefit of priority from Japanese Patent Application No. 2023-046838, filed Mar. 23, 2023, the entire contents of which are incorporated herein by reference.

FIELD

Embodiments described herein relate generally to a magnetic recording and reproducing device and a control method thereof.

BACKGROUND

In a magnetic recording and reproducing device equipped with a heat-assisted magnetic recording head, a phenomenon in which heat generated by the head causes a lubricant provided on a protective layer of a magnetic recording medium to be hardened, may occur. As a result, a laser irradiation end of the magnetic recording head may become covered. The humidity of an interior of the magnetic recording and reproducing device accelerates the decomposition of the lubricant, and as a result, hardening is more likely to occur when the humidity is high. The hardened lubricant forms protrusions on the magnetic head, which cause various errors such as scratches on the magnetic recording medium and malfunction. Therefore, it is necessary to keep the humidity to be equal to or lower than a predetermined value so that hardening of the lubricant does not easily occur.

However, during actual use of the device, it is difficult for the humidity to be kept constant, and it generally fluctuates depending on the environment and use conditions. Under these circumstances, it is desirable to prevent hardening of the lubricant while maximizing performance of the device.

DETAILED DESCRIPTION

Figure 1:
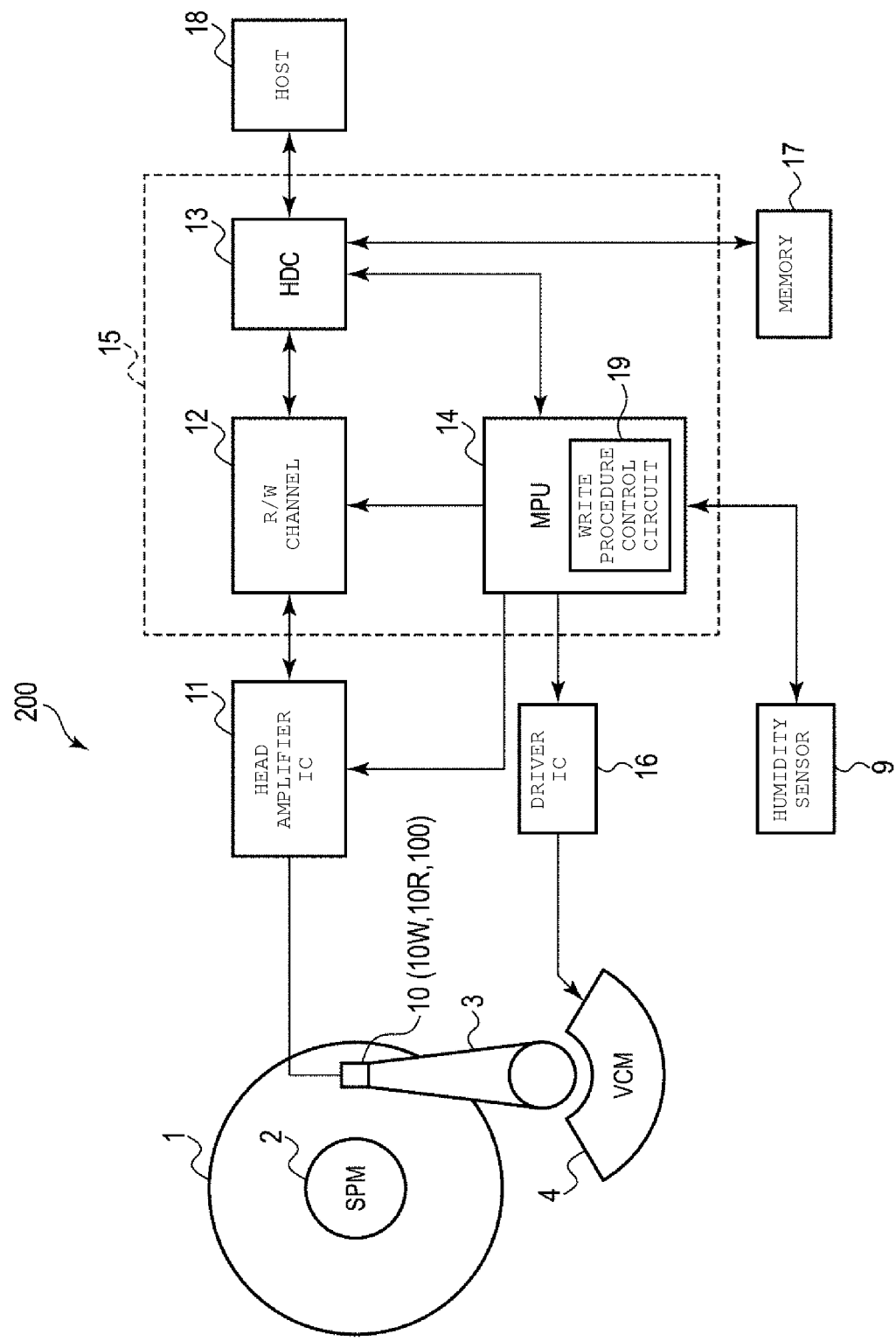
FIG. 1 is a block diagram showing an example of a configuration of a magnetic recording and reproducing device according to a first embodiment.

Embodiments provide a magnetic recording and reproducing device that performs heat-assisted magnetic recording while preventing hardening of a lubricant.

According to a first embodiment, a magnetic recording and reproducing device includes a magnetic recording medium having a lubricant on a surface of the magnetic recording medium, a heat-assisted magnetic recording head configured to perform magnetic recording on the magnetic recording medium, a humidity sensor, and a write procedure control circuit configured to control a write procedure of the heat-assisted magnetic recording head in accordance with a measurement result of the humidity sensor.

According to a second embodiment, a control method of a magnetic recording and reproducing device includes using the magnetic recording and reproducing device according to the first embodiment to control a write procedure of a heat-assisted magnetic recording head in accordance with a measurement result of a humidity sensor.

The heat-assisted magnetic recording head includes, for example, a main magnetic pole, an auxiliary magnetic pole, a near-field optical element as a heat assist element, and a laser light source that outputs laser light to the near-field optical element. By irradiating the near-field optical element with laser light, near-field light is generated from the tip of the element, and recording can be performed while a recording layer having high perpendicular magnetic anisotropy is locally heated.

The humidity sensor may be provided in any location in the interior of the magnetic recording and reproducing device. An atmospheric pressure sensor may be further provided as needed. A lubricant is applied, for example, to the surface of a protective layer that protects a recording layer of the magnetic recording medium. The near-field light may heat the recording layer and also a lubricating layer. The write procedure is, for example, a continuous write time for the recording layer by the heat-assisted magnetic recording head, or a write duty for the recording layer by the heat-assisted magnetic recording head. The continuous write time refers to the continuous write time during a non-idle operation. The write duty is a ratio of the total write time to a total elapsed time equal to a total HDD driving time. The time period during which the write duty is equal to or greater than a predetermined value (%) can be defined as the continuous write time.

The write procedure control circuit performs control not to exceed the upper limit value of the continuous write time or the setting value of the write duty. The write procedure control circuit can perform various processes, for example, conversion of the continuous write time or the write duty corresponding to the measurement result of the humidity sensor, setting of the upper limit value of the continuous write time or the setting value of the write duty, measurement of the continuous write time or the write duty, changes of the heat-assisted magnetic recording head, and a non-write operation of the heat-assisted magnetic recording head. The write procedure control circuit can set the write procedure for each heat-assisted magnetic recording head according to the humidity in the device.

The upper limit value of the continuous write time is the time during which the write operation is performed continuously until the magnetic recording and reproducing device is subject to malfunctioning. For example, in a plurality of magnetic recording and reproducing devices, the time during which a write operation is performed continuously until malfunction occurs can be measured, and the average value can be stored as upper limit data of the continuous write time. The setting value of the write duty is referred to as the write duty at which the magnetic recording and reproducing device is subject to malfunctioning. For example, in a plurality of magnetic recording and reproducing devices, the write duty when the write operation malfunctions can be measured, and the average value can be stored as setting value data.

When heat-assisted magnetic recording is performed in a state where the humidity in the magnetic recording and reproducing device is high, the lubricant tends to be picked up by the heat-assisted magnetic recording head due to decomposition of the lubricant due to heating. The picked-up lubricant tends to be hardened on the magnetic head due to the heat generated by laser to the point where reflowing is not possible, causing malfunctions such as seek errors. On the other hand, when the write procedure control circuit performs heat-assisted magnetic recording, changes the heat-assisted magnetic recording head, or performs a non-write operation before the picked-up lubricant is hardened, it is possible to accelerate reflowing of the lubricant and prevent hardening.

According to the embodiment, the magnetic recording and reproducing device including the heat-assisted magnetic recording head includes the humidity sensor and the write procedure control circuit that controls the write procedure of the heat-assisted magnetic recording head in accordance with the measurement result of the humidity sensor. Thus, it is possible to perform heat-assisted magnetic recording while preventing hardening of the lubricant.

EXAMPLES

Hereinafter, embodiments will be described with reference to the drawings. It should be noted that the present disclosure is merely an example, and appropriate modifications that can be easily conceived by those skilled in the art while keeping the gist of the present disclosure are naturally included in the scope of the present disclosure. In addition, in order to make the description clearer, the drawings may schematically show the width, thickness, shape, and the like of each unit which may differ from the actual ones, but this is only an example, and the interpretation of the present disclosure is not limited. Further, in the present specification and the drawings, the same elements as those described above with reference to the above-described drawings are denoted by the same reference signs, and detailed description thereof can be omitted as appropriate.

Example 1

First, an example of a configuration of a disk drive according to the first embodiment will be described with reference to FIG. 1. The configuration of the disk drive, which is the magnetic recording and reproducing device shown in FIG. 1, is also applied to each embodiment described later.

As shown in FIG. 1, a disk drive 200 is a perpendicular magnetic recording type magnetic disk device in which a magnetic disk (simply referred to as a disk below) 1 being a perpendicular magnetic recording medium and a magnetic head 10 having a magnetic flux control layer, which will be described later, are incorporated.

Figure 2:
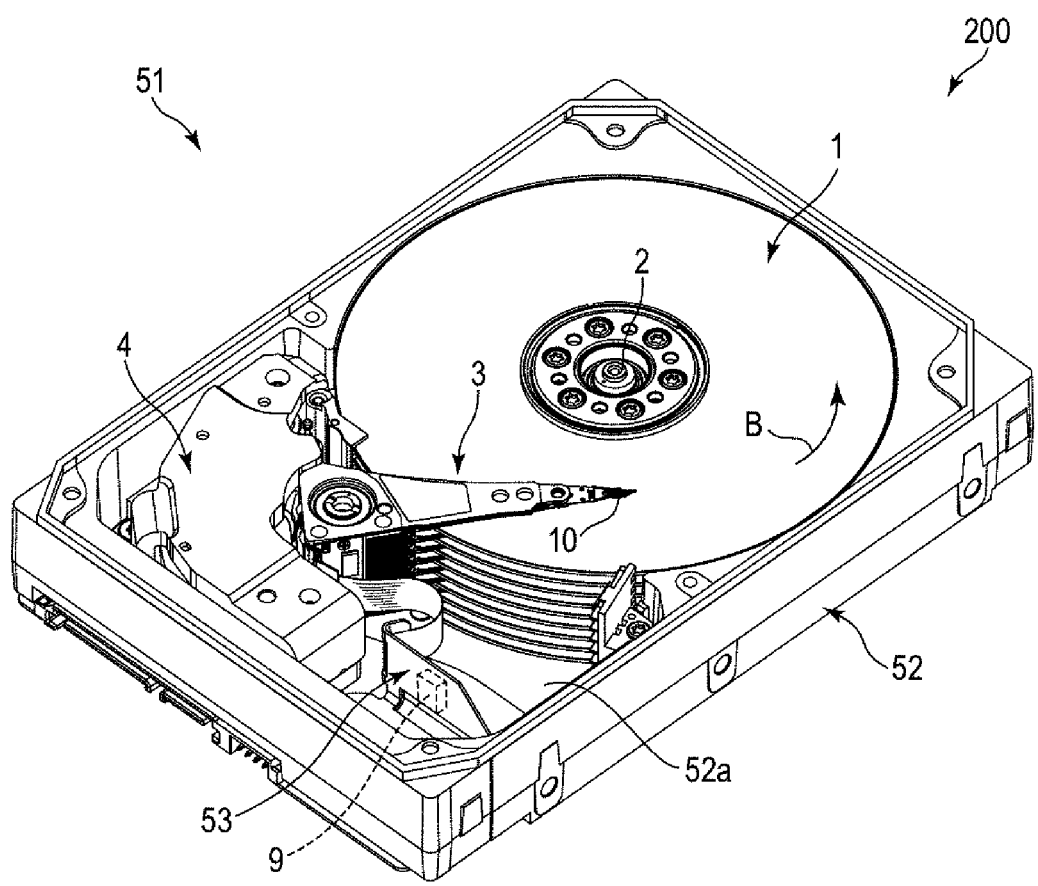
FIG. 2 is a perspective view of the magnetic recording and reproducing device according to the first embodiment.

FIG. 2 is a portion of an exploded perspective view of the magnetic recording and reproducing device according to the first embodiment. FIG. 2 shows a state in which a plurality of magnetic disks 1 and a plurality of magnetic heads 10 are housed in a housing 51 in the magnetic recording and reproducing device according to the first embodiment. A lid portion is omitted.

The disk 1 is fixed to a spindle motor (SPM) 2 and is attached for rotational movement. The magnetic head 10 is mounted on an actuator 3 and configured to move radially over the disk 1. The actuator 3 is rotationally driven by a voice coil motor (VCM) 4. The magnetic head 10 includes a write head 10W, a read head 10R, and a heat assist unit 100. The write head 10W writes data to the magnetic disk 1. The read head 10R reads data from the magnetic disk 1. The heat assist unit 100 assists in writing data when the write head 10W writes data to the magnetic disk 1. The magnetic head 10 may include a single or a plurality of magnetic heads. A humidity sensor 9 is provided at any location within the housing 51 of the magnetic disk device to measure the humidity in the device interior. In FIG. 2, the humidity sensor 9 is provided between the magnetic disk 1 and a board unit (FPC unit) 53 on which electronic components such as a conversion connector are mounted, for example, in an empty space on the bottom wall 52a of a base 52. An atmospheric pressure sensor (not shown) can be further provided as needed.

The disk drive further includes a head amplifier integrated circuit (referred to as a head amplifier IC below) 11, a read/write channel (R/W channel) 12, a hard disk controller (HDC) 13, a microprocessor (MPU) 14, a driver IC 16, and a memory 17. The R/W channel 12, the HDC 13, and the MPU 14 are incorporated in a controller 15 configured with a one-chip integrated circuit.

The head amplifier IC 11 includes a circuit group for driving a laser diode for performing heat assistance, as will be described later. The head amplifier IC 11 further includes a driver that supplies a recording signal (write current) corresponding to write data supplied from the R/W channel 12 to the write head 10W. The head amplifier IC 11 further includes a read amplifier that amplifies a read signal output from the read head 10R and transmits the amplified signal to the R/W channel 12.

The R/W channel 12 is a signal processing circuit for read/write data. The HDC 13 constitutes an interface between the disk drive and a host 18, and performs read/write data transfer control.

The MPU 14 is the main control circuit of the disk drive, and performs servo control necessary for controlling read/write operations and positioning the magnetic head 10. The MPU 14 further includes a write procedure control circuit 19 that controls the write procedure of the write head 10W for heat-assisted magnetic recording in accordance with the measurement result from the humidity sensor 9.

The memory 17 includes a flash memory, a buffer memory configured with a DRAM, and the like. In the embodiments, the write procedure control circuit 19 is an application-specific integrated circuit or a microprocessor programmed with instructions to perform the functions of the write procedure control circuit 19 described herein.

Figure 3:
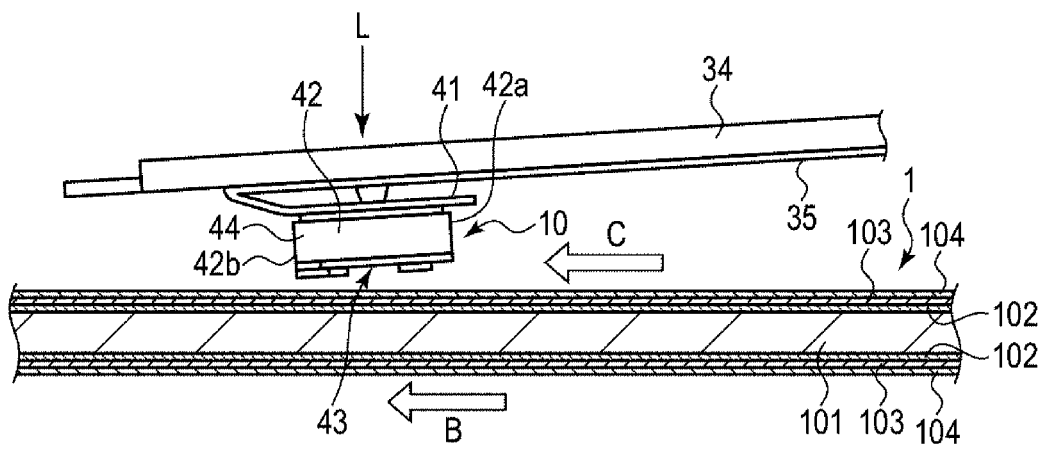
FIG. 3 is a side view showing a magnetic head 10 and a suspension.

FIG. 3 is a side view showing the magnetic head 10 and a suspension. As shown in FIG. 3, each magnetic head 10 is configured as a floating head, and includes a substantially rectangular parallelepiped slider 42 and a recording/reproducing head unit 44 provided at an outflow end (trailing end) of the slider 42. The magnetic head 10 is fixed to a gimbal spring 41 provided at the tip of a suspension 34. A head load L directed toward the surface of the magnetic disk 1 is applied to each magnetic head 10 due to the elasticity of the suspension 34. As shown in FIG. 2, each magnetic head 10 is connected to the head amplifier IC 11 and the HDC 13 through the suspension 34 and a wiring member (flexure) 35 fixed on an arm.

Figure 4:
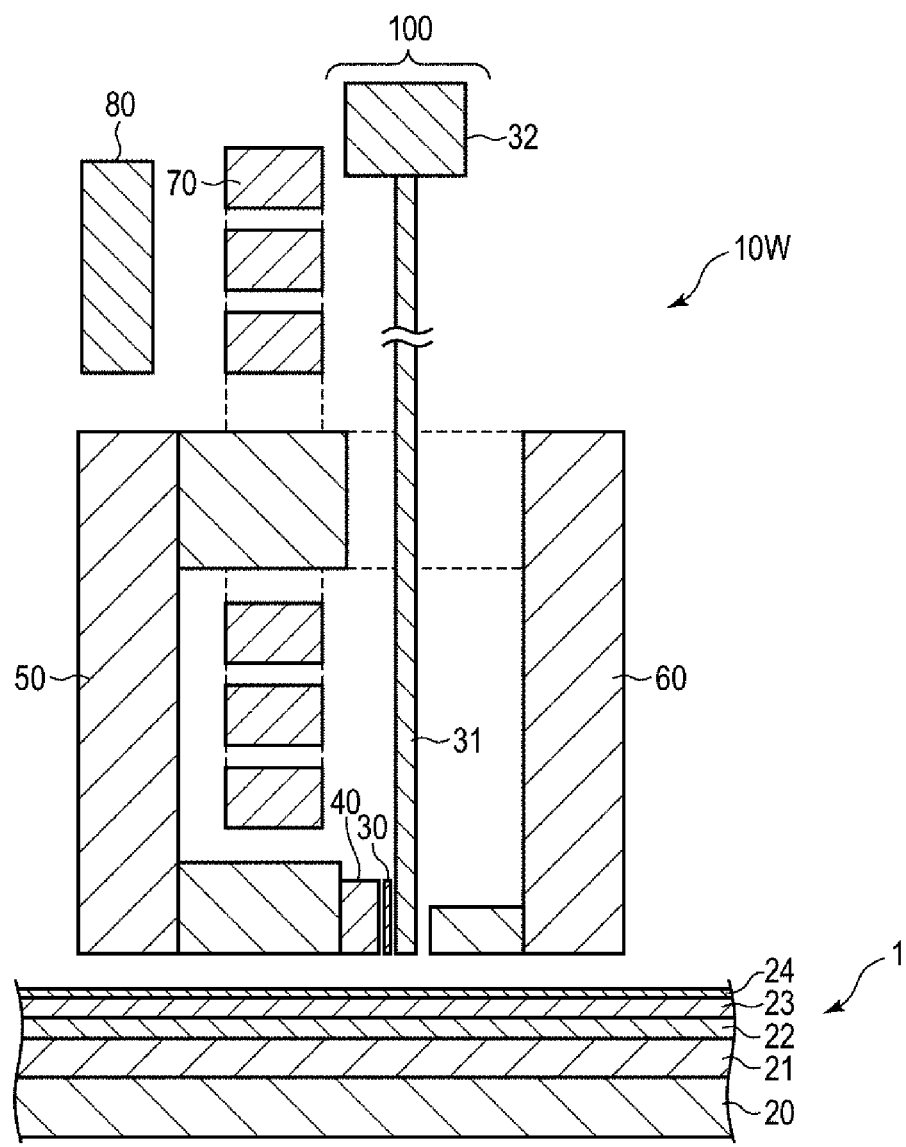
FIG. 4 is a cross-sectional view of a portion of the magnetic read and write device according to the first embodiment.

Next, the configurations of the magnetic disk 1 and the magnetic head 10 will be described in detail. FIG. 4 is a cross-sectional view of the write head 10W and the magnetic disk 1, which are portions of the magnetic disk device. The magnetic disk 1 includes a substrate 20, a heat sink layer 21, a crystal alignment layer 22, a perpendicular recording layer 23, and a protective film 24 having a surface coated with a lubricant. The heat sink layer 21, the crystal alignment layer 22, the perpendicular recording layer 23, and the protective film 24 are sequentially laminated on the substrate 20. The perpendicular recording layer 23 has large anisotropy in a direction perpendicular to the disk surface. The crystal alignment layer 22 is disposed under the perpendicular recording layer 23 in order to improve the orientation of the perpendicular recording layer 23. The heat sink layer 21 is disposed under the crystal alignment layer 22 in order to limit the spread of the heated area. The protective film 24 is disposed over the perpendicular recording layer 23 to protect the perpendicular recording layer 23.

The magnetic head 10 is a separated type magnetic head in which a write head 10W and a read head 10R are separated. The write head 10W includes a main magnetic pole 40 configured with a high permeability material that generates a magnetic field perpendicular to the disk surface, a trailing yoke 50 that causes magnetic flux to flow to the main magnetic pole 40 and is magnetically joined to the main magnetic pole, a return shield magnetic pole 60 that is disposed on the leading side of the main magnetic pole 40 and effectively closes a magnetic path directly under the main magnetic pole, a coil 70 that is disposed to be wound around the magnetic path including the trailing yoke and the return shield magnetic pole in order to cause magnetic flux to flow to the main magnetic pole 40, a heater 80 for controlling the flying height of a recording head, a near-field optical element 30 that generates near-field light for heating the perpendicular recording layer 23 of the magnetic recording medium 1 on the leading side of the main magnetic pole 40, and a waveguide 31 for causing light for generating the near-field light to propagate. A light source is incorporated in the form in which a laser diode 32 is mounted on the slider of the actuator assembly 4. As the near-field optical element 30, for example, Au, Pd, Pt, Rh, Ir, or an alloy configured with some combination thereof can be used. As an insulating layer provided between the main magnetic pole and the near-field optical element, for example, oxides configured with $SiO_2$ and $Al_2O_3$ can be used.

A recording method of heat-assisted magnetic recording that can be used in the magnetic disk device 200 includes so-called CMR in which tracks at intervals in the radial direction are written and recording is performed so that adjacent tracks do not overlap, shingled magnetic recording, so-called SMR in which tracks overlapped in order in the radial direction are provided, and are recorded by overlapping portions of adjacent tracks, interlaced magnetic recording, so-called IMR in which a bottom track and a top track in which adjacent tracks are alternately overlapped are provided, and after recording on the bottom track, data is recorded on an interlaced top track so as to overlap the bottom track, and combinations thereof.

Figure 5:
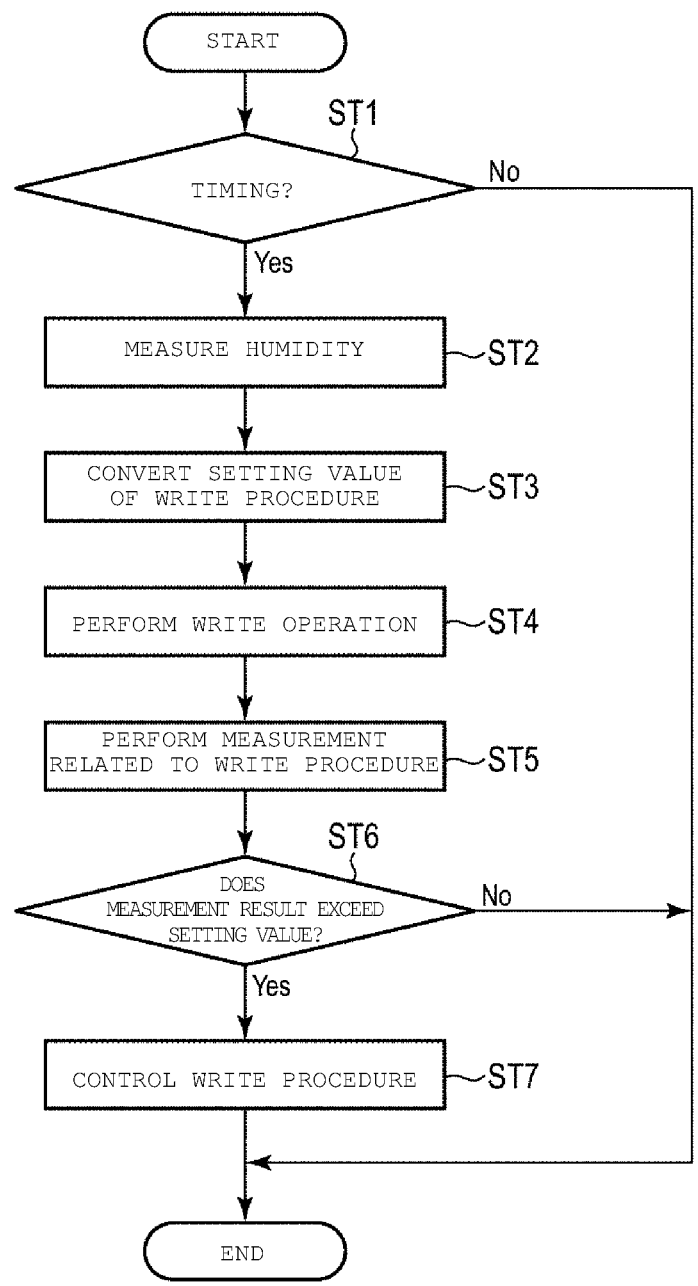
FIG. 5 is a flowchart showing an example of a control method of a magnetic read and write device according to a second embodiment.

FIG. 5 shows a flowchart showing an example of a control method of a magnetic recording and reproducing device according to a second embodiment. The flowchart of FIG. 5 shows an example of the control operation of the write procedure of the heat-assisted magnetic recording head corresponding to the humidity. Before the control operation of the write procedure, the control mode of the write procedure used for controlling the write procedure is determined in advance. Here, it is determined whether to use the upper limit value of the continuous write time, the setting value of the write duty, or both of the upper limit value and the setting value.

As shown in FIG. 5, the control operation of the write procedure is started. First, it is determined whether it is time to measure the humidity by the humidity sensor 9 (ST1). When a result of the determination is No, the control operation of the write procedure is ended. When a result of the determination is of Yes, the humidity is measured by using the humidity sensor 9 (ST2). The measurement may be performed once, but a value having less error can be obtained by performing the measurement five to ten times and using the average value. This humidity is obtained as the relative humidity at the device temperature (water vapor partial pressure contained in the device/saturated water vapor pressure at the device temperature). Here, the setting value of the write procedure is converted for the measured humidity (ST3). Here, the conversion is performed for the setting value of the write procedure, which is determined in advance, for example, the upper limit value of the continuous write time, the setting value of the write duty, or both of the upper limit value and the setting value. For example, conversion values may be given by the following expressions (1) and (2).

$$\ln(\text{write duty setting value (\%)}) = \quad (1)$$
$$\ln(\text{device relative humidity (\%)}) \times A_1 + B_1$$

In the expression, $A_1$ and $B_1$ respectively represent the slope and the intercept of the relational expression between the write duty and the natural logarithm of the device humidity.

$$\ln(\text{continuous write time upper limit value (hours)}) = \quad (2)$$
$$\ln(\text{device relative humidity (\%)}) \times A_2 + B_2$$

In the expression, $A_2$ and $B_2$ are the slope and the intercept for the continuous write time upper limit value, respectively. The write duty and the natural logarithm of the continuous write time upper limit value are proportional to the natural logarithm of the device relative humidity.

Then, a recording operation is performed (ST4). After a predetermined period of time has elapsed, measurement related to the write procedure is performed (ST5). Regarding the measurements related to the write procedure, measurements may be performed for the write procedure determined in advance, for example, the continuous write time, the write duty, or both of the continuous write time and the write duty. Then, it is determined whether the measurement result related to the write procedure exceeds the setting value (ST6). When a result of the determination is No, the control operation of the write procedure is ended. When a result of the determination is Yes, the write procedure control circuit 19 controls the write procedure not to exceed the setting value (ST7). When the magnetic head 10 includes a plurality of magnetic heads, the write procedure control circuit 19 either changes the magnetic head to another head, or performs a non-write operation such as read or idle without changing the magnetic head, and then ends the control operation of the write procedure.

After the control operation of the write procedure is ended, the control operation of the write procedure is restarted when a predetermined period of time has elapsed, and the steps ST1 to ST7 are repeated. In step ST6, it is determined whether the measurement result related to the write procedure exceeds the setting value. When a result of the determination is No, the recording operation (ST4), and the measurement (ST5) and determination (ST6) related to the write procedure may be repeated for a predetermined period of time without ending the control operation of the write procedure.

Figure 6:
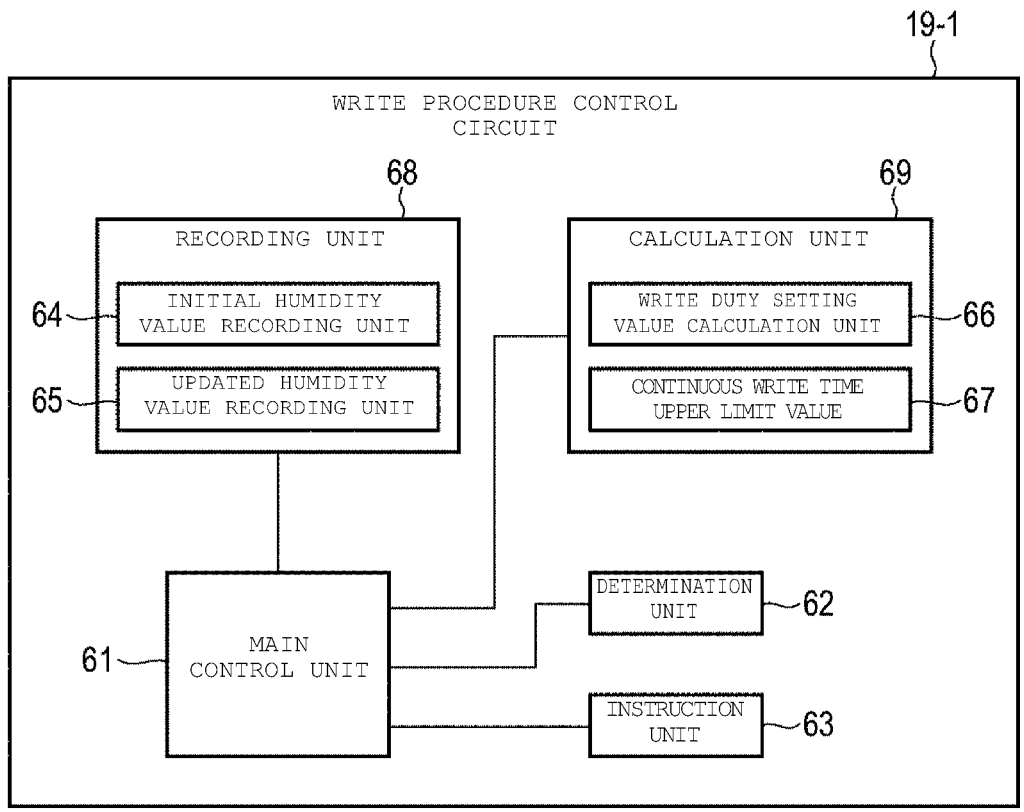
FIG. 6 is a block diagram showing an example of a write procedure control circuit.

FIG. 6 shows a block diagram showing another example of the write procedure control circuit. A write procedure control circuit 19-1 may be used instead of the write procedure control circuit 19 in FIG. 1. As in FIG. 6, the write procedure control circuit 19-1 includes a recording unit 68 that records humidity information from the humidity sensor 9, a calculation unit 69 that calculates the setting value for the write procedure based on the humidity information from the recording unit 68, a determination unit 62 that determines control of the write procedure when the measurement result related to the write procedure exceeds the setting value of the write procedure, an instruction unit 63 that receives the determination result of the determination unit 62 and instructs the control of the write procedure, and a main control unit 61 that are connected to the recording unit 68, and the calculation unit 69, the determination unit 62, and the instruction unit 63 and controls the entirety of the write procedure control circuit 19-1. The recording unit 68 includes an initial humidity value recording unit 64 and an updated humidity value recording unit 65. The calculation unit 69 includes a write duty setting value calculation unit 66 and a continuous write time upper limit calculation unit 67. The write procedure control circuit 19-1 is an application-specific integrated circuit that is configured to carry out the functions of each of the units of the write procedure control circuit 19-1 described herein, or a microprocessor programmed with instructions to perform the functions of the write procedure control circuit 19-1 and each of the units of the write procedure control circuit 19-1 described herein.

Using the write procedure control circuit 19-1, when the humidity is measured in the step of ST2 in FIG. 5, the recording unit 68 can record the initial value of the humidity measurement result in an initial humidity value recording unit 64. When the steps from ST1 to ST7 are repeated twice or more times, the recording unit 68 can record the updated value of the humidity measurement result in the updated humidity value recording unit 65. The calculation unit 69 can convert the setting value of the write procedure in the step of ST3 in FIG. 5. When the setting value of the write procedure is the setting value of the write duty, the write duty setting value calculation unit 66 can calculate the setting value of the write duty based on the humidity information from the recording unit 68. When the setting value of the write procedure is the continuous write time upper limit value, the continuous write time upper limit calculation unit 67 can calculate the upper limit value of the continuous write time based on the humidity information from the recording unit 68. The determination unit 62 can receive the measurement result in the step of ST6 and determine the control of the write procedure. Furthermore, the instruction unit 63 can receive the determination result of the determination unit 62 and instruct the control of the write procedure. Here, for example, the head amplifier IC 11 can be controlled to change the magnetic head or perform a non-write operation.

Figure 7:
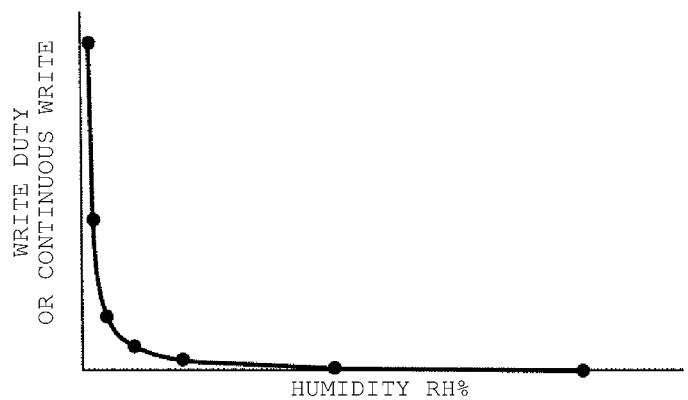
FIG. 7 is a graph showing a relationship between internal humidity of the device and a write procedure.

FIG. 7 shows a graph showing the relationship between the internal humidity of the device and the write procedure. In FIG. 7, the reference sign 301 indicates a graph representing the upper limit value of the continuous write time or the write duty with respect to the humidity. As shown in FIG. 7, the higher the humidity, the lower the upper limit value of the continuous write time or the write duty. From the above description, when the write procedure is the continuous write time, the write procedure control circuit 19 can set the continuous write time to become shorter as the measurement result of the humidity sensor becomes higher. Further, when the write procedure is the write duty, the write procedure control circuit 19 can set the write duty to become shorter as the measurement result of the humidity sensor becomes higher.

Example 2

Forty magnetic disk devices having the same configuration as in FIG. 1 were prepared. Humidity in each device was 20%±3%. In a state where, as Comparative Example 1, 20 units were subjected to no control of the write procedure in writing, and in a state where, as Example 2, 20 units were subjected to control of the write procedure, an intensive write test was performed for 700 hours in total writing time. During intensive writing, the write duty of each head was set to 90%. The control mode was set to the write duty, and the conversion value was calculated by using the expression (1).

In the expression, $A_1$ and $B_1$ were set to −1.1 and 2.2. The write duty obtained from this calculation result was approximately 33%. When the write operation was performed so that the write duty exceeded 33%, standby was performed in the idle state. The bit error rate (BER) was measured before and after the test, and an error rate that exceeds 10 to the −1.8 power was determined as NG. The number of NGs before the test was 0 under both conditions. The number of NGs after the test is shown in Table 1 below.

TABLE 1

| | Control Mode | Write Duty (%) | Number of NGs |
|---|---|---|---|
| Example 2 | Write Duty | 33 | 0/20 |
| Comparative Example 1 | No Control | 90 | 20/20 |

According to Example 2, the number of NGs was 0, but the number of NGs was 20 in the device without control. After the evaluation, when the device was disassembled and AFM observation was performed around the head, it was understood that the lubricant was agglomerated and hardened around the head, and hindered the smooth operation of the head.

Example 3

Forty magnetic disk devices having the same configuration as in FIG. 1 were prepared. The humidity in each device was set to 10%±3%. In a state where, as Comparative Example 2, 20 units were subjected to no control of the write procedure in writing, and in a state where, as Example 3, 20 units were subjected to control of the write procedure, an intensive write test was performed for 700 hours in total writing time. During intensive writing, the write duty of each head was set to 90%. The control mode was set to as the continuous write time, and the time during which the write duty was 50% or more was regarded as the continuous write time. Here, the conversion value was obtained by using the expression (2).

In the expression, $A_2$ and $B_2$ were set to −1.2 and 4.7. The continuous write upper limit time obtained from this calculation result is 8.7 hours. When the write operation was performed longer than the continuous write upper limit time, a period of time during which nothing was done (idle) was inserted so that the write duty of the setting value fell below 50%. The bit error rate (BER) was measured before and after the test, and an error rate that exceeds 10 to the −1.8 power was determined as NG. The number of NGs before the test was 0 under both conditions. The number of NGs after the test is shown in Table 2 below.

TABLE 2

|  | Control Mode | Write Upper Limit Time (hrs.) | Number of NGs |
|---|---|---|---|
| Example 3 | Continuous Write Time | 8.7 | 0/20 |
| Comparative Example 2 | No Control | No Control | 20/20 |

According to Example 3, the number of NGs was 0, but the number of NGs was 20 in the device without control. After the evaluation, when the device was disassembled and AFM observation was performed around the head, it was understood that the lubricant was agglomerated and hardened around the head, and hindered the smooth operation of the head.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic recording and reproducing device comprising:
   a magnetic recording medium having a lubricant on a surface of the magnetic recording medium;
   a heat-assisted magnetic recording head configured to perform magnetic recording on the magnetic recording medium;
   a humidity sensor; and
   a write procedure control circuit configured to control a write procedure of the heat-assisted magnetic recording head in accordance with a measurement result of the humidity sensor.

2. The magnetic recording and reproducing device according to claim 1, wherein
   the write procedure control circuit sets an upper limit value of a continuous write time to stop the magnetic recording head from continuously performing the magnetic recording on the magnetic recording medium for longer than the upper limit value.

3. The magnetic recording and reproducing device according to claim 2, wherein
   the write procedure control circuit sets the upper limit value to be smaller as humidity obtained from the measurement result of the humidity sensor becomes higher.

4. The magnetic recording and reproducing device according to claim 1, wherein
   the write procedure control circuit sets an upper limit value of a write duty to stop the magnetic recording head from performing the magnetic recording on the magnetic recording medium when a ratio of the total write time to a total elapsed time of the magnetic recording and reproducing device exceeds the upper limit value.

5. The magnetic recording and reproducing device according to claim 4, wherein
   the write procedure control circuit sets the upper limit value to be smaller as humidity obtained from the measurement result of the humidity sensor becomes higher.

6. The magnetic recording and reproducing device according to claim 1, further comprising:
   one or more additional heat-assisted magnetic recording heads, wherein
   the write procedure control circuit changes the heat-assisted magnetic recording head when a continuous write time or a write duty of the heat-assisted magnetic recording head exceeds an upper limit value.

7. The magnetic recording and reproducing device according to claim 1, wherein
   the write procedure control circuit performs a non-write operation with the heat-assisted magnetic recording head when a continuous write time or a write duty of the heat-assisted magnetic recording head exceeds an upper limit value.

8. The magnetic recording and reproducing device according to claim 1, wherein
   the magnetic recording medium and the heat-assisted magnetic recording head are installed within a housing interior of the magnetic recording and reproducing device, and the humidity sensor is arranged to measure a humidity of the housing interior.

9. A control method for a magnetic recording and reproducing device that includes a magnetic recording medium having a lubricant on a surface of the magnetic recording medium, a heat-assisted magnetic recording head configured to perform magnetic recording on the magnetic recording medium, and a humidity sensor, said method comprising:
   controlling a write procedure of the heat-assisted magnetic recording head in accordance with a measurement result of the humidity sensor.

10. The control method according to claim 9, wherein said controlling includes:
    setting an upper limit value of a continuous write time to stop the magnetic recording head from continuously performing the magnetic recording on the magnetic recording medium for longer than the upper limit value.

11. The control method according to claim 10, wherein
    the upper limit value is set to be smaller as humidity obtained from the measurement result of the humidity sensor becomes higher.

12. The control method according to claim 9, wherein said controlling includes:
    setting an upper limit value of a write duty to stop the magnetic recording head from performing the magnetic recording on the magnetic recording medium when a ratio of the total write time to a total elapsed time of the magnetic recording and reproducing device exceeds the upper limit value.

13. The control method according to claim 12, wherein
    the upper limit value is set be smaller as humidity obtained from the measurement result of the humidity sensor becomes higher.

14. The control method according to claim 9, wherein said controlling includes:

switching to another heat-assisted magnetic recording head when a continuous write time or a write duty of the heat-assisted magnetic recording head exceeds an upper limit value.

15. The control method according to claim 9, wherein said controlling includes:
performing a non-write operation with the heat-assisted magnetic recording head when a continuous write time or a write duty of the heat-assisted magnetic recording head exceeds an upper limit value.

16. The control method according to claim 9, wherein the magnetic recording medium and the heat-assisted magnetic recording head are installed within a housing interior of the magnetic recording and reproducing device, and the humidity sensor is arranged to measure a humidity of the housing interior.

17. A magnetic recording and reproducing device comprising:
a housing;
a magnetic recording medium installed within the housing and having a lubricant on a surface of the magnetic recording medium;
a heat-assisted magnetic recording head installed within the housing and configured to perform magnetic recording on the magnetic recording medium;
a humidity sensor installed within the housing to measure a humidity within the housing; and
a write procedure control circuit configured to control a write procedure of the heat-assisted magnetic recording head in accordance with the measured humidity.

18. The magnetic recording and reproducing device according to claim 17, wherein
the write procedure control circuit sets an upper limit value of a continuous write time to be smaller as the measured humidity becomes higher and stops the magnetic recording head from continuously performing the magnetic recording on the magnetic recording medium for longer than the upper limit value.

19. The magnetic recording and reproducing device according to claim 17, wherein
the write procedure control circuit sets an upper limit value of a write duty to be smaller as the measured humidity becomes higher and stops the magnetic recording head from performing the magnetic recording on the magnetic recording medium when a ratio of the total write time to a total elapsed time of the magnetic recording and reproducing device exceeds the upper limit value.

20. The magnetic recording and reproducing device according to claim 17, wherein
the write procedure control circuit switches to another heat-assisted magnetic recording head or performs a non-write operation with the heat-assisted magnetic recording head, when a continuous write time or a write duty of the heat-assisted magnetic recording head exceeds an upper limit value.

\* \* \* \* \*